(12) United States Patent
Kohno et al.

(10) Patent No.: US 7,827,882 B2
(45) Date of Patent: Nov. 9, 2010

(54) DIFFERENTIAL GEAR UNIT

(75) Inventors: Tetsuya Kohno, Okazaki (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 611 days.

(21) Appl. No.: 10/586,607

(22) PCT Filed: Jan. 27, 2005

(86) PCT No.: PCT/IB2005/000195

§ 371 (c)(1),
(2), (4) Date: Jul. 19, 2006

(87) PCT Pub. No.: WO2005/080822

PCT Pub. Date: Sep. 1, 2005

(65) Prior Publication Data

US 2008/0229878 A1    Sep. 25, 2008

(30) Foreign Application Priority Data

Jan. 30, 2004    (JP)    ............................ 2004-024091

(51) Int. Cl.
*F16H 48/08*    (2006.01)
*F16H 57/02*    (2006.01)
(52) U.S. Cl. ........................................ 74/607; 475/230
(58) Field of Classification Search ............... 74/606 R, 74/607; 475/246, 230
See application file for complete search history.

(56) References Cited

U.S. PATENT DOCUMENTS

| 3,901,103 | A | | 8/1975 | Hufstader | |
|---|---|---|---|---|---|
| 3,955,443 | A | * | 5/1976 | Estrada | 475/230 |
| 4,038,189 | A | * | 7/1977 | Dison et al. | 210/90 |
| 4,154,065 | A | * | 5/1979 | Diffenderfer | 464/131 |
| 4,543,853 | A | * | 10/1985 | von Hiddessen et al. | 475/246 |
| 4,589,935 | A | * | 5/1986 | Scott | 148/573 |
| 4,625,585 | A | * | 12/1986 | Dissett | 475/226 |
| 5,147,140 | A | * | 9/1992 | Murakami et al. | 384/492 |
| 5,234,388 | A | * | 8/1993 | Nordkvist | 475/246 |
| 5,951,431 | A | | 9/1999 | Downs et al. | |

(Continued)

FOREIGN PATENT DOCUMENTS

DE    101 41 995    4/2003

(Continued)

*Primary Examiner*—Richard W Ridley
*Assistant Examiner*—Thomas Diaz
(74) *Attorney, Agent, or Firm*—Oblon, Spivak, McClelland, Maier & Neustadt, L.L.P.

(57) ABSTRACT

A differential gear unit divides an input driving force into first and second outputs, and permits a difference between the first and second outputs. The differential gear unit includes a differential case serving as a casing that defines an internal space and an opening communicated with the internal space and that is rotatable in a given direction and an opposite direction. The differential case includes a flange portion as an input portion to which the driving force is input. The differential case is configured such that the fatigue life of the differential case when the driving force is repeatedly input in the flange portion in the direction R1 is longer than the fatigue life of the differential case when the driving force is repeatedly input in the flange portion in the opposite direction; R1 is the rotational direction in which the vehicle runs forward.

10 Claims, 13 Drawing Sheets

U.S. PATENT DOCUMENTS 6,139,462 A * 10/2000 Gage et al. .................. 475/248
7,320,659 B2 * 1/2008 Pritchard et al. ............. 475/331

FOREIGN PATENT DOCUMENTS

| EP | 1 433 978 | 6/2004 |
|----|-----------|--------|
| JP | 58 144141 | 9/1983 |
| JP | 5-3974 | 1/1993 |
| JP | EP0371340 A1 * | 6/1996 |
| JP | 9-229162 | 9/1997 |
| JP | 11-30315 | 2/1999 |
| JP | 2003 294109 | 10/2003 |
| WO | 89 10501 | 11/1989 |

* cited by examiner

DIFFERENTIAL GEAR UNIT

CROSS-REFERENCE TO RELATED APPLICATIONS

The present application is based on Japanese Patent Application No. 2004-024091 filed on Jan. 30, 2004, the entire contents of which are hereby incorporated by reference herein.

BACKGROUND OF THE INVENTION

1. Field of the Invention

The invention relates to a differential gear unit. More particularly, the invention relates to a differential gear unit used in an automobile.

2. Description of the Related Art

A conventional type of differential gear unit for an automobile is disclosed in, for example, Japanese Patent Laid-Open Publication No. 58-144141. The Japanese Patent Laid-Open Publication No. 58-144141 discloses a technology in which simplified pinion shafts for four-pinions, instead of a pinion shaft for two pinions, is provided in the differential gear unit which conventionally includes an undivided differential case and the pinion shaft for two pinions, that is supported with each end portion inserted in the differential case.

Further, types of differential gear units are known. Document DE 101 41 995 A1 for example discloses a differential case having two assembly openings, wherein these openings are openings are symmetrically shaped with respect to the rotation axis and arranged in parallel with respect to a longitudinal centre axis of the differential gear casing.

Further, document WO 89/10501 discloses a differential with a housing made in one piece, wherein the housing has two large side openings in its wall. Each opening is provided with two guide members for guiding associated bearings.

Still further, document U.S. Pat. No. 3,901,103 discloses a differential gear mechanism having long bolts spanning the large access hole in the differential case to increase the case strength in this region.

Document EP 1 433 978 A discloses a differential gear for a vehicle wherein three openings are formed in the differential housing. This three openings are formed at three equidistant positions along the perimeter wall section of the case for facilitating mounting side gears and pinions.

Finally, document U.S. Pat. No. 5,954,431 A1 discloses a differential gear casing including at least one assembling window formed therein for providing access to a chamber interior of the differential case, wherein the at least one opening formed with two circular edge portions interconnected by a pair of elongated edge portions of the differential case, and is symmetrically shaped with respect to a rotation axis.

Generally, the frequency of driving a vehicle forward is higher than the frequency of driving the vehicle backward. Accordingly, the above-mentioned conventional type of differential gear unit has a problem that the fatigue life of a corner portion, in which a tensile stress is generated due to a driving force on the forward side, is insufficient. Particularly, when torque output from an internal combustion engine is increased, or when a driving force to be input is increased due to a design change of gear ratio of a transmission, the fatigue life of the corner portion, in which a tensile stress is generated by a driving force on the forward side, is particularly insufficient. However, in order to realize a differential gear unit which can withstand such a large driving force, a significant design change is required and the differential gear unit needs to be increased in size. As a result, there arise problems that the mountability of the differential gear unit deteriorates and the weight thereof is increased.

SUMMARY OF THE INVENTION

In light of the above-mentioned circumstances, the invention is made in order to solve these problems. It is therefore an object to provide a differential gear unit which can withstand a large driving force, and which makes it possible to minimize increases in weight and size thereof.

Therefore, according to an aspect of the invention, there is provided a differential gear unit which divides a driving force input therein into a first output and second output and which permits a difference between a rotational speed of the first output and a rotational speed of the second output The differential gear unit includes a casing which defines an internal space and an opening communicated with the internal space, and which is rotatable in a given direction and in a direction opposite to the given direction. The casing includes an input portion in which a driving force is input. In the differential gear unit according to the aspect, the casing is configured such that the fatigue life of the casing when the driving force is repeatedly input in the input portion in the given direction is longer than that when the driving force is repeatedly input in the input portion in the direction opposite to the given direction.

In the thus configured differential gear unit, the casing is configured such that the fatigue life of the casing when the driving force is repeatedly input in the input portion in the given direction is longer than that when the driving force is repeatedly input in the input portion in the direction opposite to the given direction. Accordingly, when the given direction is set to the frequently-used rotational direction, the fatigue life of the casing at a driving force in the given direction becomes longer. Namely, the fatigue life of the casing at the rotation in the frequently-used direction is made longer and the fatigue life of the casing at the rotation in the less frequently-used direction is made shorter. Therefore, the differential gear unit is not increased in size and weight thereof, as compared to the case where the fatigue life of the casing is made longer for the rotation in both of the above-mentioned directions. Also, since the fatigue life at the rotation in the frequently-used given direction is long, the differential gear unit can withstand a large driving force.

Also, the rotation in the given direction is the rotation in the direction in which the vehicle runs forward. Generally, the vehicle runs forward more frequently than backing up. Accordingly, the differential gear unit may be used, in which the fatigue life of the casing at the rotation in the frequently-used direction in which the vehicle runs forward is longer.

Also, the differential gear unit may further include a dividing mechanism which is provided in the internal space and which divides the driving force into the first output and the second output; and a support member which is provided so as to contact the casing and so as to support the dividing mechanism. The dividing mechanism may include a pinion, and the support member may include a pinion shaft which supports the pinion such that the pinion can rotate on its axis and which makes the pinion revolve around a center of the casing.

Also, the casing may include a support portion which contacts the support member, and the fatigue life may be measured by inputting a driving force in the input portion without rotating the support member.

Also, the casing may include an output portion which is provided at a position that is different from the position of the support portion. The fatigue life may be measured by inputting a driving force in the input portion without rotating the output portion.

Also, the fatigue life of the casing may be adjusted by making a shape of the opening asymmetrical with respect to the rotational axis of the casing.

Also, the opening may be in a rectangular shape having a round shape at each of corner portions thereof, and the round shapes of the adjacent corner portions may be different from each other.

Also, a curvature radius of the round shape of the corner portion of the opening, where a tensile stress is generated when the driving force is input in the given rotational direction, may be larger than a curvature radius of the round shape of the corner portion of the opening, where a compression stress is generated when the driving force is input in the given rotational direction.

Also, the fatigue life of the casing may be adjusted by performing heat treatment on a predetermined portion.

Also, heat treatment may be performed on the corner portion of the opening of the casing, where a tensile stress is generated when the driving force is input in the given rotational direction.

The heat treatment may include at least one of induction hardening and carburizing treatment.

The fatigue life of the casing may be adjusted by performing physical treatment on a predetermined portion.

The physical treatment may be performed on the corner portion of the opening of the casing, where a tensile stress is generated when the driving force is input in the given rotational direction.

Also, the physical treatment may include at least one of shot blasting and shot peening.

By employing the above-mentioned structure and performing various treatments, the differential gear unit can be realized whose strength is high and whose fatigue life is long, and which can make it possible to suppress increases in size and weight.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Figure 1:
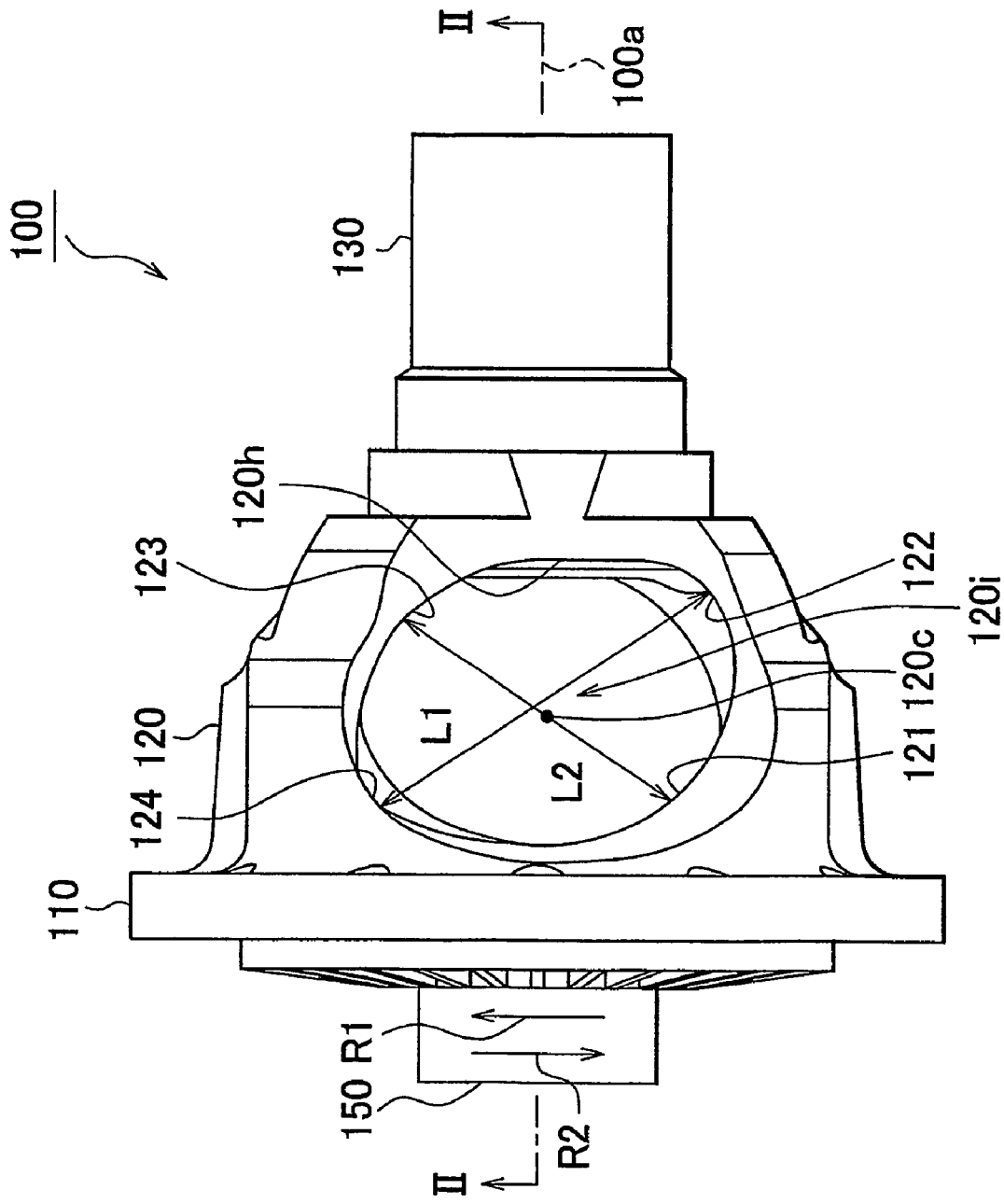
FIG. 1 is a left side view of a differential case used in a differential gear unit according to a first embodiment of the invention.

In the following description and the accompanying drawings, the present invention will be described in more detail in terms of exemplary embodiments. In the following embodiments, the same reference numerals will be assigned to the same or corresponding elements, and the description thereof will be made only once.

Figure 2:
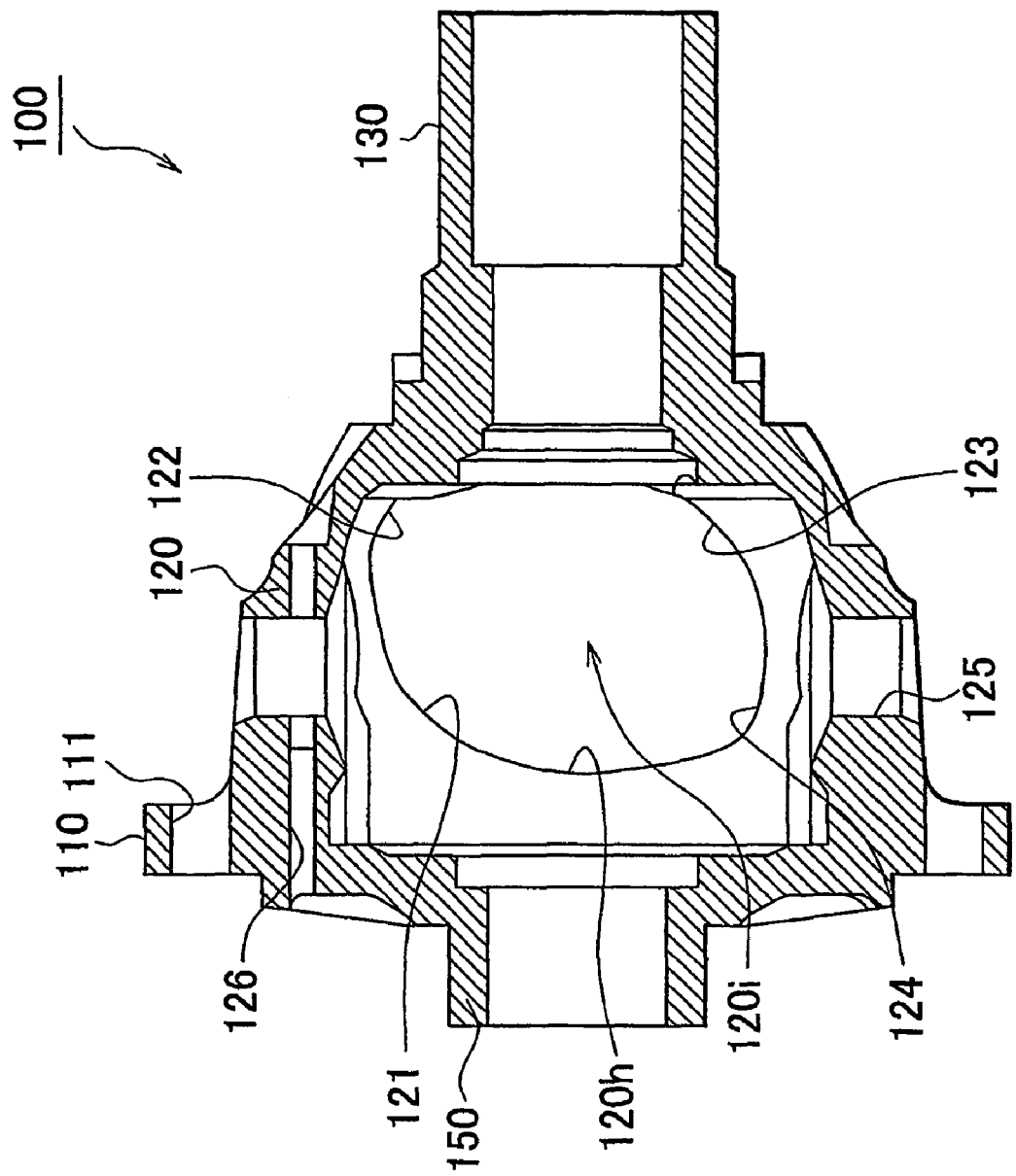
FIG. 2 is a cross sectional view taken along line II-II in FIG. 1.
Figure 3:
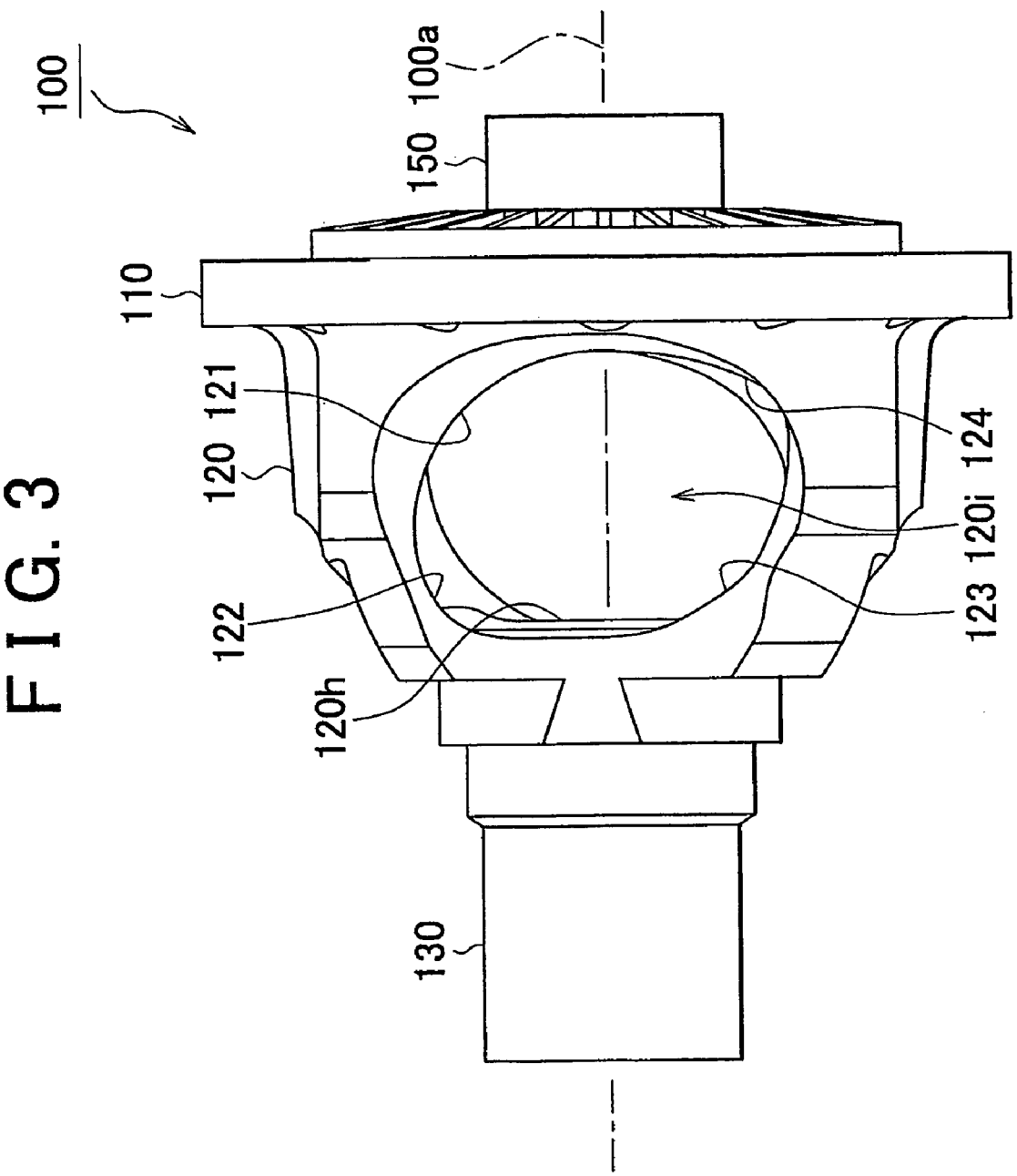
FIG. 3 is a right side view of the differential case used in the differential gear unit according to the first embodiment of the invention.

FIG. 1 is a left side view of a differential case used in a differential gear unit according to a first embodiment of the invention. FIG. 2 is a cross sectional view taken along line II-II in FIG. 1. FIG. 3 is a right side view of the differential case used in the differential gear unit according to the first embodiment of the invention. Referring to FIGS. 1 to 3, a differential case 120 used in a differential gear unit 100 according to the first embodiment of the invention is in a box-shape and has an internal space 120*i*. A flange portion 110 and a protruding portion 150 are provided at one end of the differential case 120, and an output portion 130 is provided at the other end. Each of the protruding portion 150 and the output portion 130 has a cylindrical shape, and is communicated with the internal space 120*i*. The outer diameter of the differential case 120 is decreased from the flange portion 110 to the output portion 130.

Elements constituting the differential gear unit 100, for example, pinions which divide power, a pinion shaft which supports the pinions, and side gears which are meshed with the pinions are provided in the internal space 120*i*. An opening 120*h* for inserting these elements into the internal space 120*i* is formed in a side surface of the differential case 120. Namely, the opening 120*h* is formed in each of a right side surface and a left side surface. These openings h are formed in a symmetrical pattern.

The opening 120*h* is in a basically elliptical shape having a round shape at each of the corner portions. The shape of the opening 120*h* is asymmetrical with respect to a rotational axis 100*a* of the differential case 120. A longer diagonal line of the opening 120*h* is referred to as L1, and a shorter diagonal line of the opening 120*h* is referred to as L2 (L2 is shorter than L1). In the first embodiment, the opening 120 has a basically elliptical shape having a round shape at each of the corner portions thereof. However, the corner portions are not necessarily rounded.

The flange portion 110 is connected to a ring gear (not shown). The ring gear receives power from a drive pinion, and transmits the power to the flange portion 110. Thus, the flange portion 110 can be rotated in both the direction shown by an arrow R1 and the direction shown by an arrow R2. Multiple holes 111 are formed in the flange portion 110, and a bolt is inserted in each of the holes 111, whereby the ring gear is attached to the flange portion 110.

The cylindrical protruding portion 150 is provided so as to be adjacent to the flange portion 110. A drive shaft is inserted in the protruding portion 150. The protruding portion 150 can be supported by a bearing in a differential carrier or a transmission case. The protruding portion 150 is provided coaxially with the output portion 130.

The opening 120h is defined by a first corner portion 121, a second corner portion 122, a third corner portion 123 and a fourth corner portion 124. Each corner portion has a round shape or a curved surface shape in which the radius of the round shape continuously changes. Each of the first corner portion 121 and the third corner portion 123 has a large curvature radius, that is, has a gentle curvature. Each of the second corner portion 122 and the fourth corner portion 124 has a small curvature radius, that is, has a sharp curvature.

Since the distance from a center 120c of the opening 120h to each of the first corner portion 121 and the third corner portion 123 is short, the strength of the differential case 120 at the first corner portion 121 and the third corner portion 123 becomes higher. On the other hand, since the distance from the center 120c of the opening to each of the second corner portion 122 and the fourth corner portion 124 is long, the strength of the differential case 120 at the second corner portion 122 and the fourth corner portion 124 becomes lower. When each component is inserted in the internal space 120i, the component is inserted through the opening 120h. When the size of the component is L1 or smaller, the component can be inserted in the internal surface 120i through the opening 120h.

There is formed a hole 125 for inserting the pinion shaft such that the pinion shaft penetrates the differential case 120. The direction in which the hole 125 extends is perpendicular to the direction in which the rotational axis 100a extends. Also, a hole 126 for inserting a pin is formed in the direction perpendicular to the direction in which the hole 125 extends.

Figure 4:
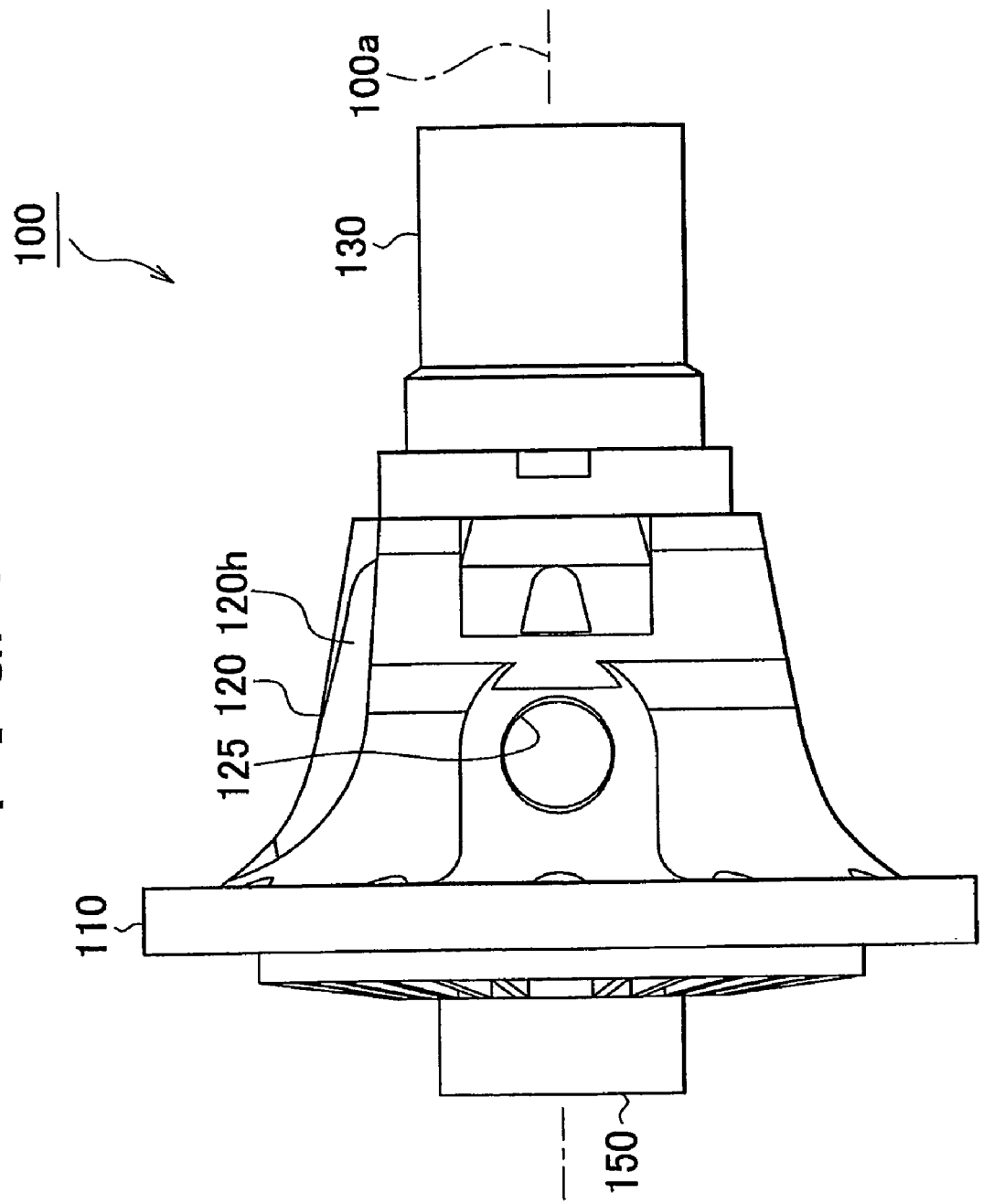
FIG. 4 is a plan view of the differential case used in the differential gear unit according to the first embodiment of the invention.

FIG. 4 is a plan view of the differential case used in the differential gear unit according to the first embodiment of the invention. A bottom plan view is in the same shape as the plan view. Referring to FIG. 4, the hole 125 is formed at a top portion of the differential case 120. The hole 125 has a substantially circular shape. As shown in the plan view, although the opening 120h in an upper side portion in FIG. 4 can be seen, the opening in a lower side portion cannot be seen. Based on this as well, it is understood that the shape of the opening 120h is asymmetrical with respect to the rotational axis 100a.

Figure 5:
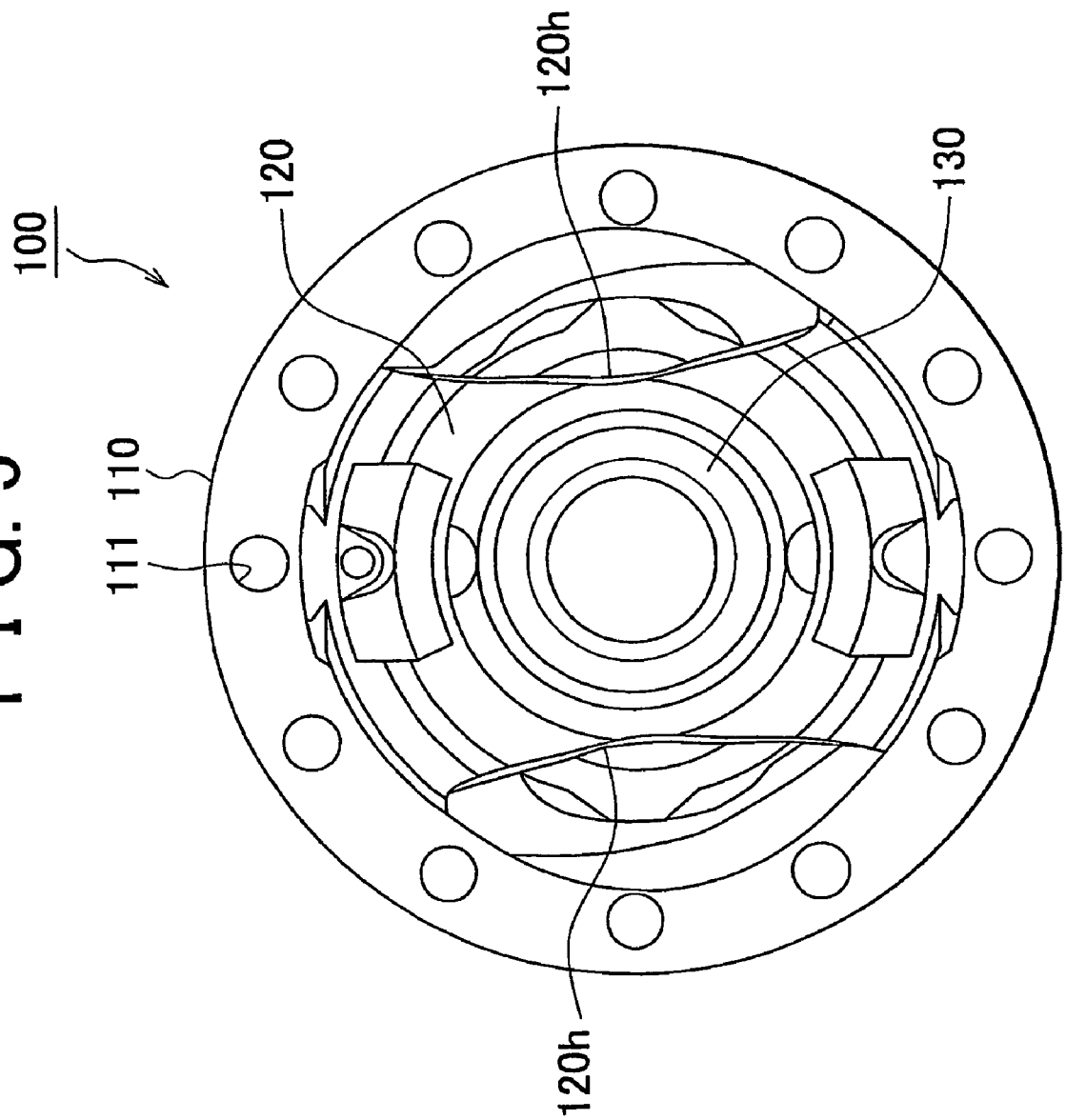
FIG. 5 is a front view of the differential case used in the differential gear unit according to the first embodiment of the invention.
Figure 6:
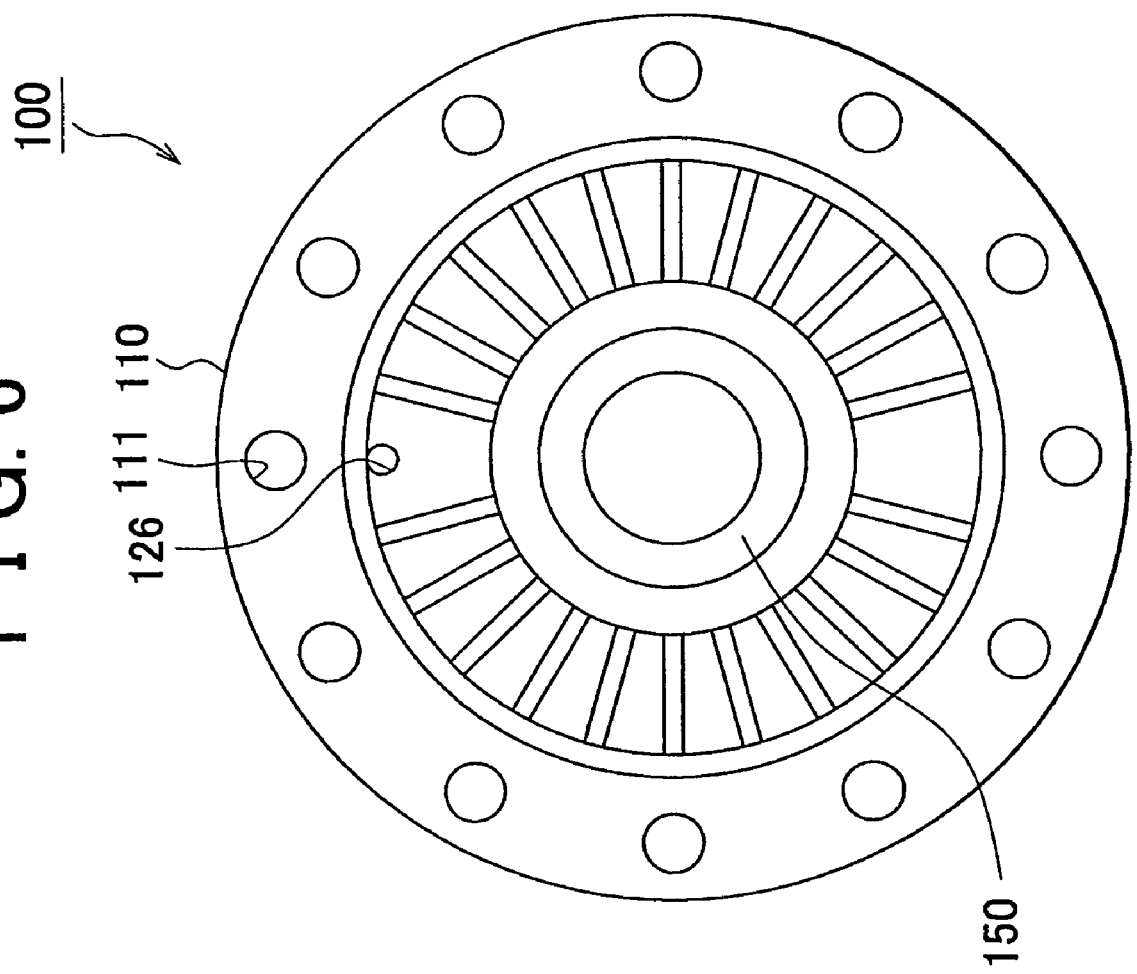
FIG. 6 is a rear view of the differential case used in the differential gear unit according to the first embodiment of the invention.
Figure 7:
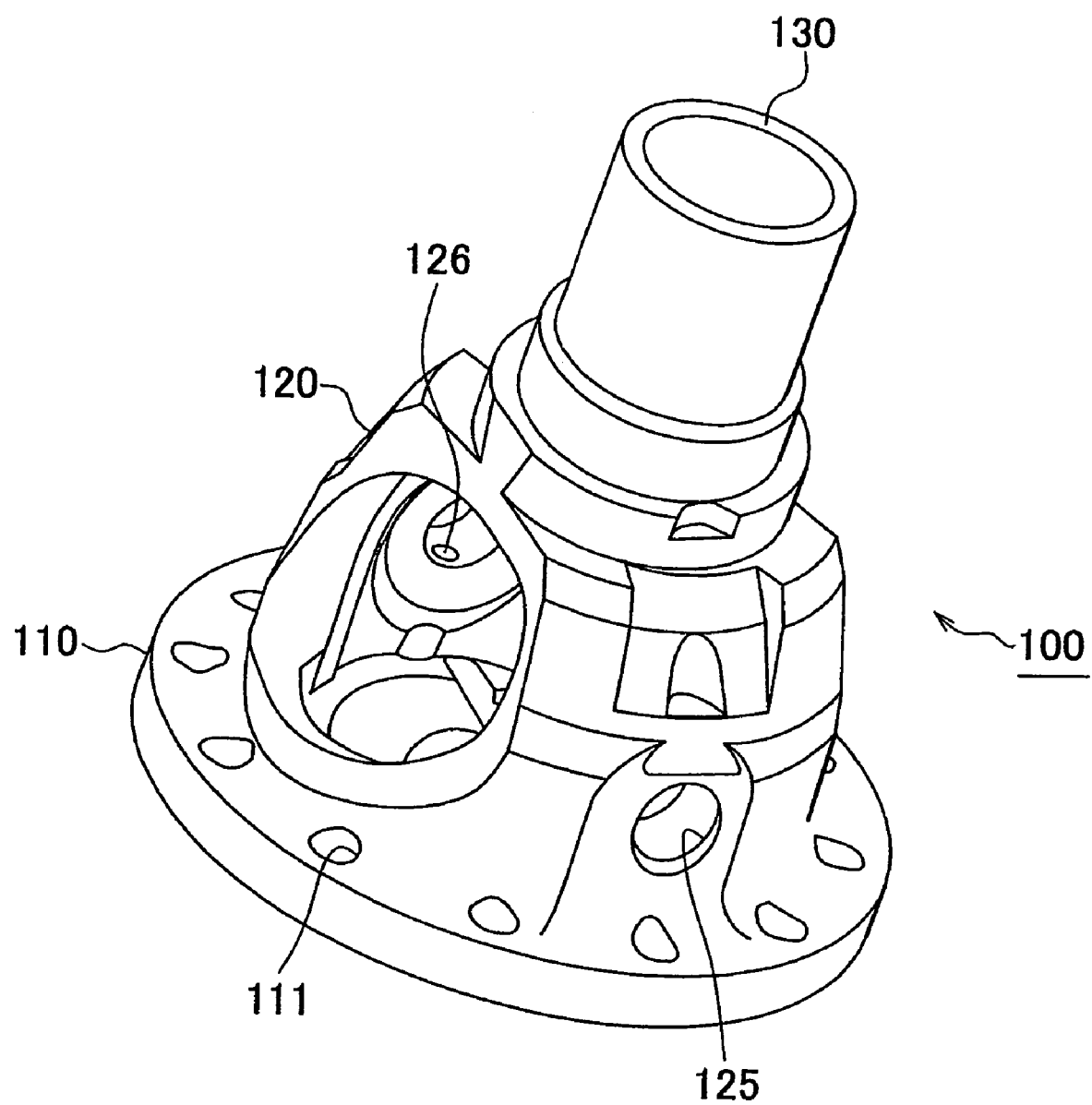
FIG. 7 is a perspective view of the differential case used in the differential gear unit according to the first embodiment of the invention.
Figure 8:
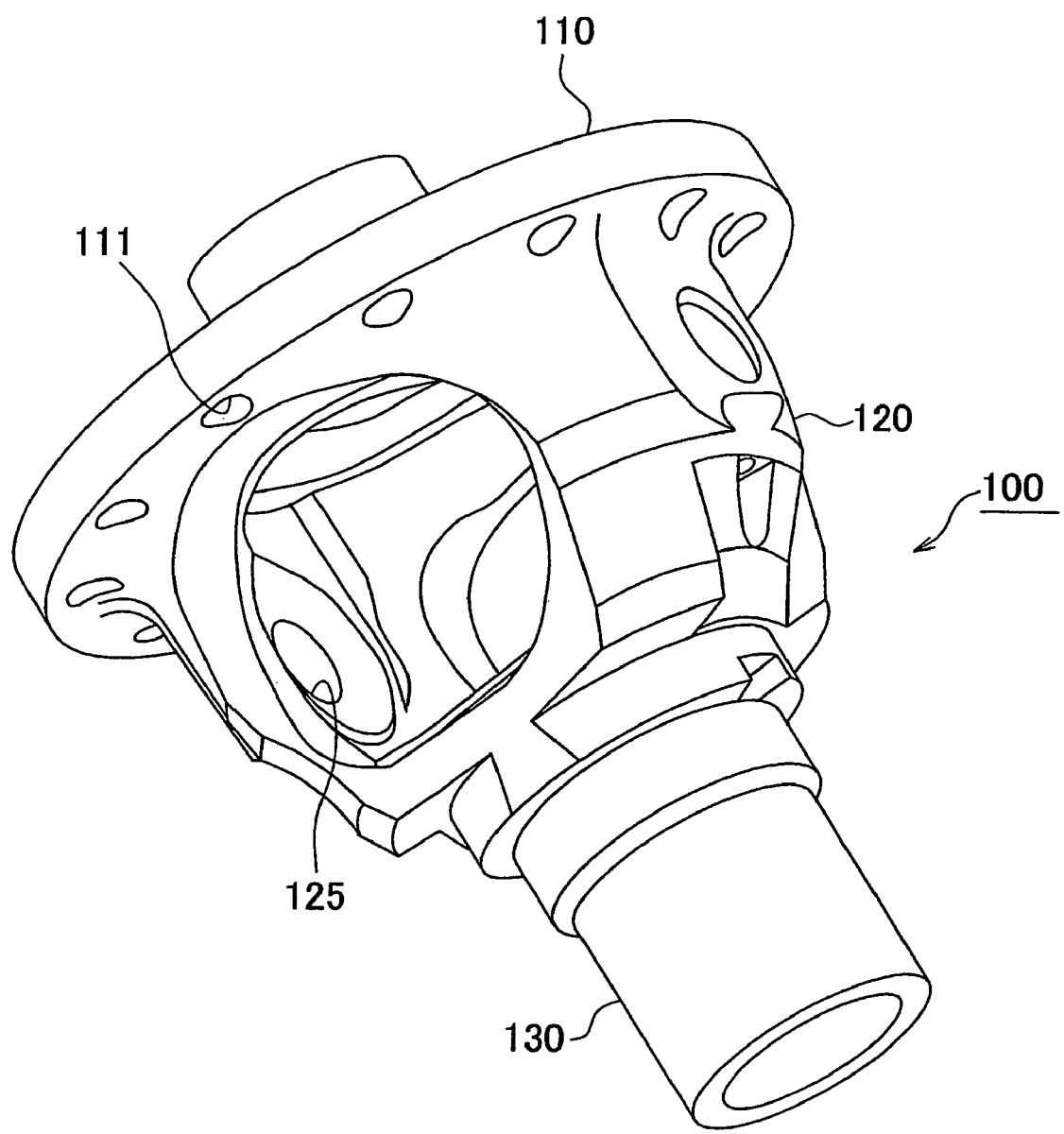
FIG. 8 is a perspective view of the differential case used in the differential gear unit according to the first embodiment of the invention.
Figure 9:
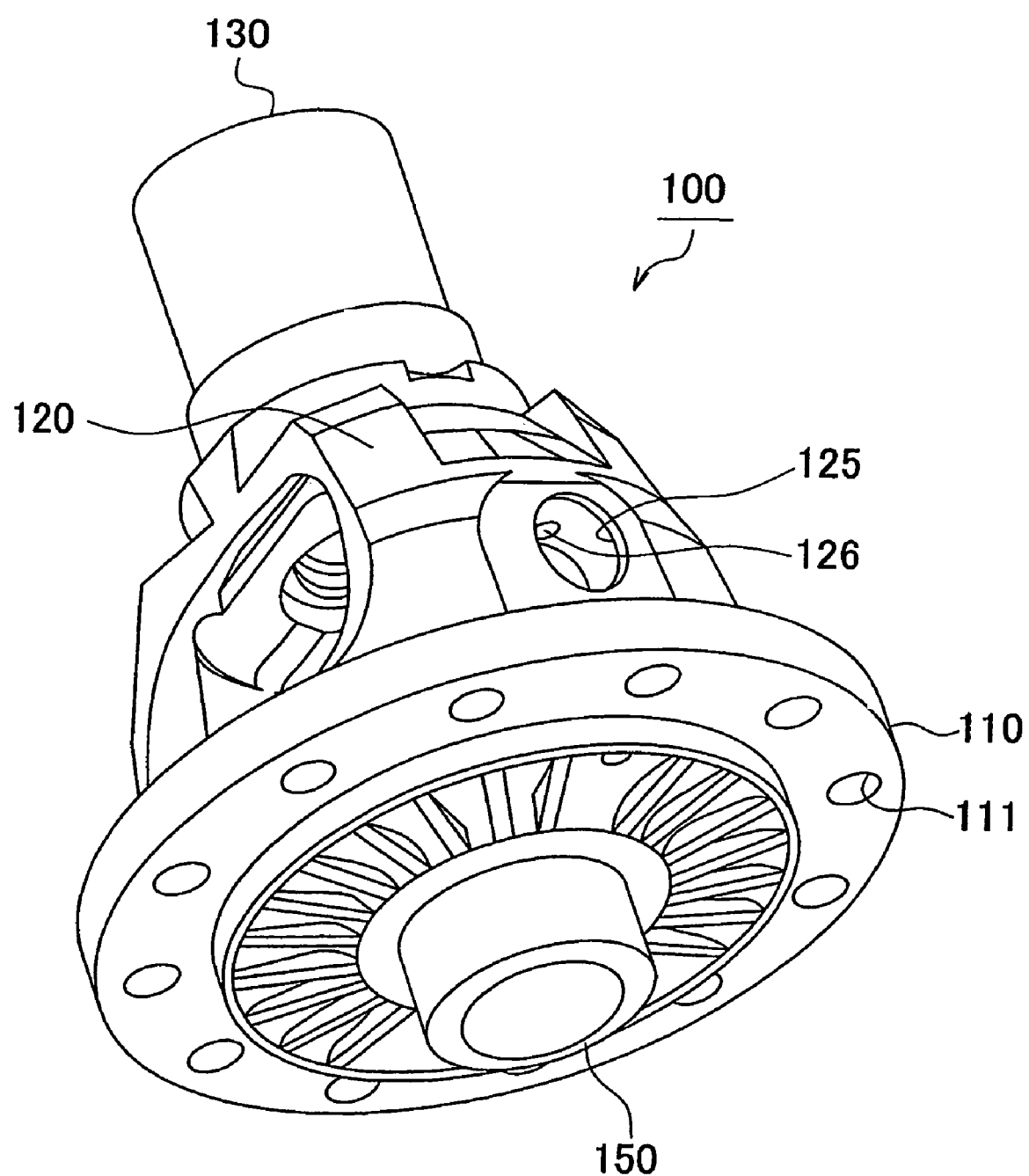
FIG. 9 is a perspective view of the differential case used in the differential gear unit according to the first embodiment of the invention.
Figure 10:
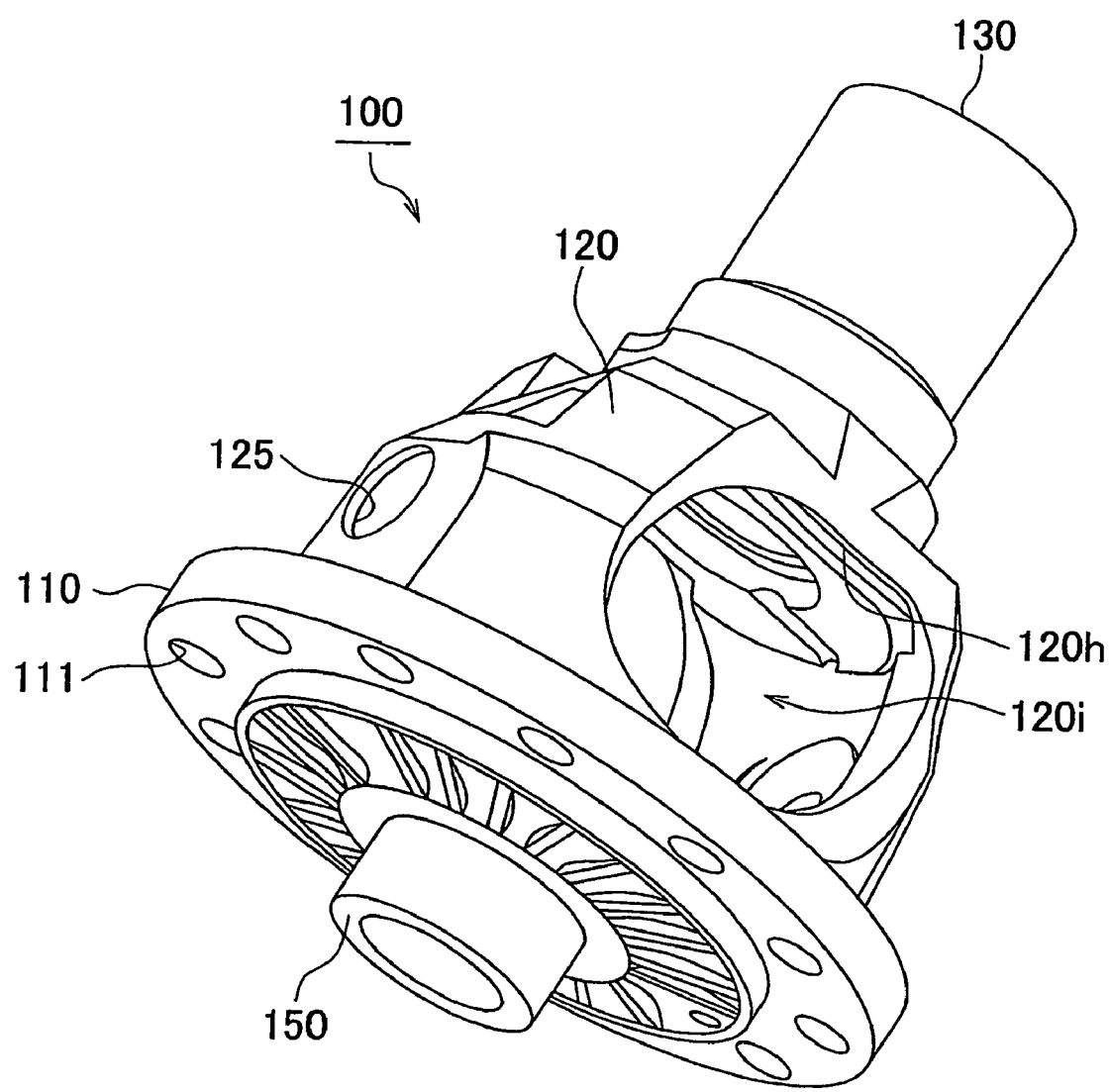
FIG. 10 is a perspective view of the differential case used in the differential gear unit according to the first embodiment of the invention.

FIG. 5 is a front view of the differential case used in the differential gear unit according to the first embodiment of the invention. FIG. 6 is a rear view of the differential case used in the differential gear unit according to the first embodiment of the invention. Referring to FIGS. 5 and 6, the flange portion 110 of the differential case 120 has a disc-shape, and holes 111 are formed so as to divide the periphery of the flange portion 110 into equal portions. Note that the number and arrangement of the holes 111 are not limited to those shown in FIGS. 5 and 6. The holes 111 may be formed so as to divide the periphery of the flange portion 110 into unequal portions.

As shown in FIG. 5, the opening 120h is formed on each of the right and left sides of the differential case 120. The output portion 130 is connected to a rear wheel via a propeller shaft. A drive shaft is inserted in the output portion 130, and the drive shaft and the output portion 130 can be rotated with a relative rotational difference. Also, another drive shaft is inserted in the protruding portion 150. A side gear is connected to each of these drive shafts.

Each of FIGS. 7 to 10 is a perspective view of the differential case used in the differential gear unit according to the first embodiment of the invention. Referring to FIGS. 7 to 10, the differential case 120 includes the cylindrical protruding portion 150; the disc-shaped flange portion 110 in which a driving force is input; and the output portion 130 which is provided at the end portion of the differential case 120, which is positioned opposite to the protruding portion 150. The differential case 120 defines the internal space 120i communicated with the protruding portion 150 and the output portion 130. The opening 120h for permitting communication between the internal space and the outside is formed in the side surface of the differential case 120. The hole 125 for inserting the pinion shaft is formed at a position different from the position of the opening 120h.

Figure 11:
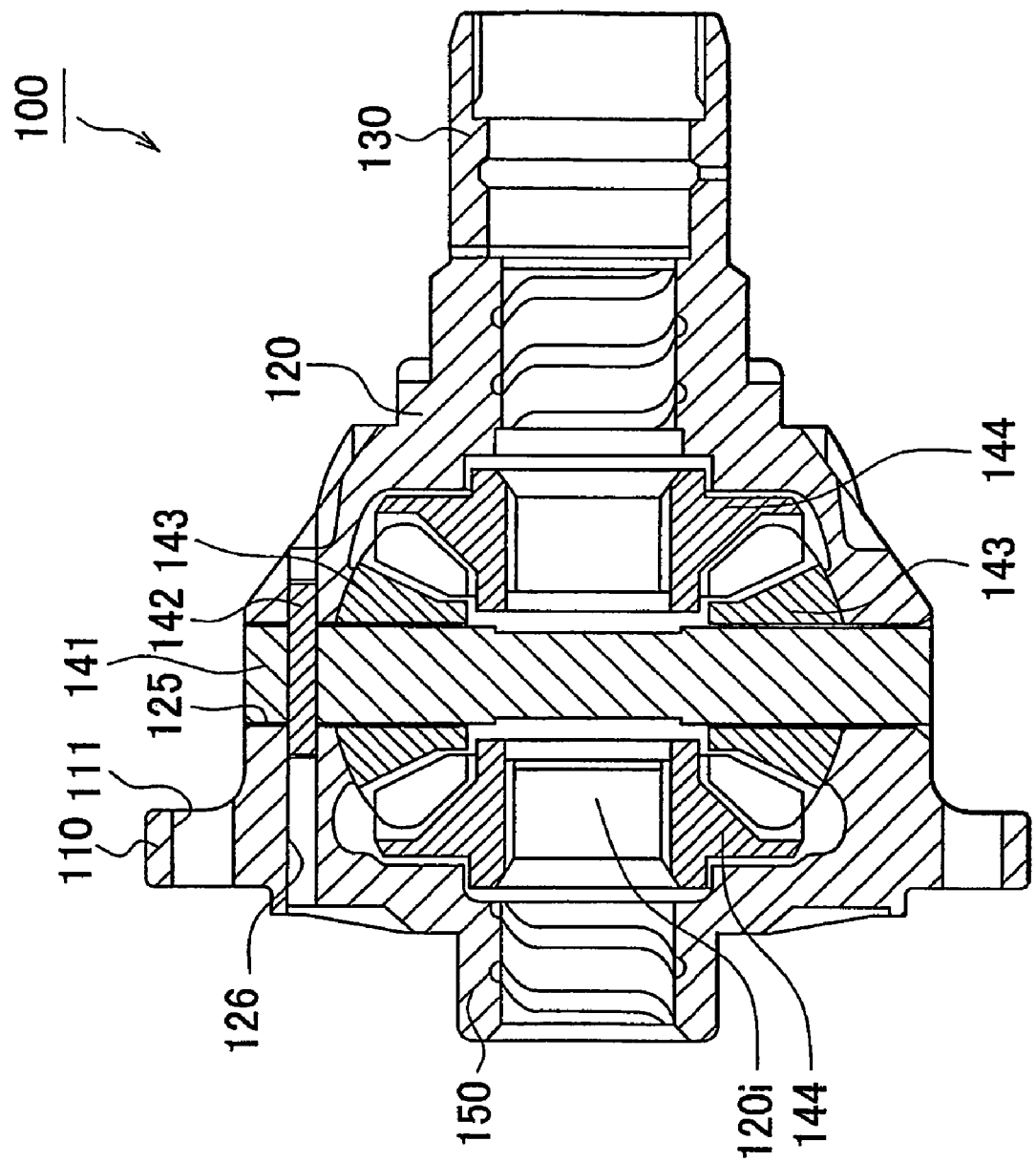
FIG. 11 is a cross sectional view of the differential gear unit according to the first embodiment of the invention.

FIG. 11 is a cross sectional view of the differential gear unit according to the first embodiment of the invention. Referring to FIG. 11, a pinion 143 which divides power; a pinion shaft 141 which supports the pinion 143; a pin 142 which positions the pinion shaft 141; and paired side gears 144 meshed with the pinion 143 are provided in the internal space 120i. Note that, in FIG. 11, a constant-velocity joint is not provided in the side gear 144. However, an element of the constant-velocity joint may be integrally provided in the side gear 144.

The side gear 144 is connected to the drive shaft, and an output from the side gear 144 is transmitted to a wheel. The output portion 130 is connected to the propeller shaft. Note that the differential gear unit 100 in the embodiment is used as a front differential for a four-wheel drive vehicle without a center differential.

The pinion shaft 141 is provided so as to penetrate the internal space 120i. The pinion 143 can be rotated about the pinion shaft 141. Since the pinion shaft 141 can be rotated along with the differential case 120 in the directions shown by the arrows R1 and R2 in FIG. 1, the pinion 143 can also be rotated in the directions shown by the arrows R1 and R2. Namely, the pinion 143 can rotate on its axis and revolve around the center of the differential case 120.

The pinion shaft 141 is positioned by the pin 142. The pinion 143 and the side gear 144 slide over the inner surface of the differential case 120 which defines the internal space 120i. Therefore, in the inner surface of the differential case 120, the abrasion resistance of the portion, over which the pinion 143 and the side gear 144 slide, can be increased by heat treatment or the like.

The differential gear unit 100 according to the first embodiment of the invention divides the driving force input therein into the first output and the second output, and permits the difference between the first output and the second output. The differential gear unit 100 includes the differential case 120 serving as a casing which defines the internal space 120i and the opening 120h communicated with the internal space 120i, and which can be rotated in the given direction (the direction shown by the arrow R1) and the direction opposite to the given direction (shown by the arrow R2).

The differential case 120 includes the flange portion 110 as the input portion in which a driving force is input. The differential case 120 is configured such that the fatigue life of the differential case 120 when a driving force is repeatedly input in the flange portion 110 in the direction shown by the arrow R1 is longer than the fatigue life of the differential case 120 when a driving force is repeatedly input in the flange portion 110 in the direction opposite to the direction shown by the arrow R1 (the direction shown by the arrow R2).

The direction shown by the arrow R1 is the rotational direction in which the vehicle runs forward. The differential gear unit 100 further includes the pinion 143 serving as a dividing mechanism which is provided in the internal space 120i and which divides a driving force into the first output and the second output; and the pinion shaft 141 serving as a support member which is provided so as to contact the differential case 120 and so as to support the pinion 143. The pinion shaft 141 supports the pinion 143 such that the pinion 143 can rotate on its axis. Also, the pinion shaft 141 can make the pinion 143 revolve around the center of the differential case 120.

The differential case 120 has the hole 125 as a support portion which permits contact with the pinion shaft 141. The fatigue life is measured by inputting a driving force in the flange portion 110 without rotating the support portion. The differential case 120 includes the output portion 130 for outputting the driving force. The fatigue life is measured by inputting a driving force in the flange portion 110 without rotating the output portion 130. Namely, at least one of the fatigue life of the portion between the flange portion 110 and the hole 125 and the fatigue life of the portion between the flange portion 110 and the output portion 130 is long for rotation in a given direction and short for rotation in a direction opposite to the given direction.

The fatigue life of the differential case 120 is adjusted by making the shape of the opening 120h asymmetrical with respect to the rotational axis 100a. Also, the opening 120h is in a basically elliptical shape having a round shape at each of the corner portions, and the round shapes of the adjacent corner portions are different from each other.

In the differential case 120 provided in the differential gear unit 100 according to the invention, the shape of the opening 120h is asymmetrical with respect to the rotational axis 100a. Namely, in the differential gear unit including the differential case 120 in which the opening 120h is formed through which the side gear 144 and the pinion 143 can be provided the inside of the differential case 120, the shape of the opening 120h is formed such that the fatigue life when a driving force, which is applied in the forward rotational direction and which is equal to a driving force applied in the backward rotational direction, is repeatedly applied to the differential gear unit, is longer than the fatigue life when a driving force applied in the backward rotational direction is repeatedly applied to the differential gear unit.

More particularly, the opening 120h is in the basically elliptical shape having a round shape at each of the corner portions thereof, and the round shapes of the corner portions, which are adjacent to each other in the rotational direction of the differential gear unit 100, are different from each other. It is thus possible to obtain the fatigue life necessary for the increased driving force while maintaining the assembly performance of a differential gear. Therefore, the size of the differential case 120 need not be changed. As a result, the mountability of the differential gear unit 100 is increased, and an increase in weight thereof can be suppressed. Also, the above-mentioned effects can be reliably obtained with a small design change by adjusting the round shape of the corner portion.

The corner portions will be described in detail. Generally, the life of the steel constituting the differential case 120 for a tensile stress is rather short, and the life thereof for a compression stress is rather long. Accordingly, when the fatigue life of the portion where a tensile stress is generated in the frequently-used rotational direction (the rotational direction for forward running) is made longer, the fatigue life of the entire differential case is increased. In the first corner portion 121 and the third corner portion 123, a tensile stress is generated when the vehicle runs forward, that is, when a driving force is supplied in the direction shown by the arrow R1. As a result, by increasing the curvature radius at this portion, the strength of the first corner portion 121 and the third corner portion 123 is increased. On the other hand, the curvature radius is made smaller in the second corner portion 122 and the fourth corner portion 124 in which a compression stress is generated. Thus, the diagonal line L1 is made longer, and a space, in which the differential gear unit is inserted, is obtained.

In the differential case 120, the tensile stress and the compression stress are generated between the portion in which a driving force is input and the portion which outputs the driving force. When the above-mentioned differential gear unit is used as a differential gear unit for a two-wheel drive vehicle, a driving force is input from the flange portion 110, and the hole 125 for holding the pinion shaft 141 supports the output driving force. As a result, the above-mentioned tensile stress and compression stress are generated between the flange portion 110 and the hole 125. The differential gear unit is designed such that the life of each of the first corner portion 121 and the third corner portion 123, in which the tensile stress is generated, is made longer.

The torque required to break the opening 120h by rotating the flange portion 110 of the differential case 120 is referred to as the braking torque. The fatigue life is evaluated by inputting 40% of the braking torque in the flange portion 110, and fixing a predetermined portion of the differential case 120, based on the number of times the torque is input until the opening 120h breaks.

When the output portion 130 is connected to the rear propeller shaft, a driving force is input in the flange portion 110, and output from the output portion 130. In this case, the life of the portion, where a tensile stress is generated between the flange portion 110 and the output portion 130, is made long.

With the thus configured differential gear unit according to the invention, increases in weight and size thereof can be minimized, and the life thereof can be made longer.

Figure 12:
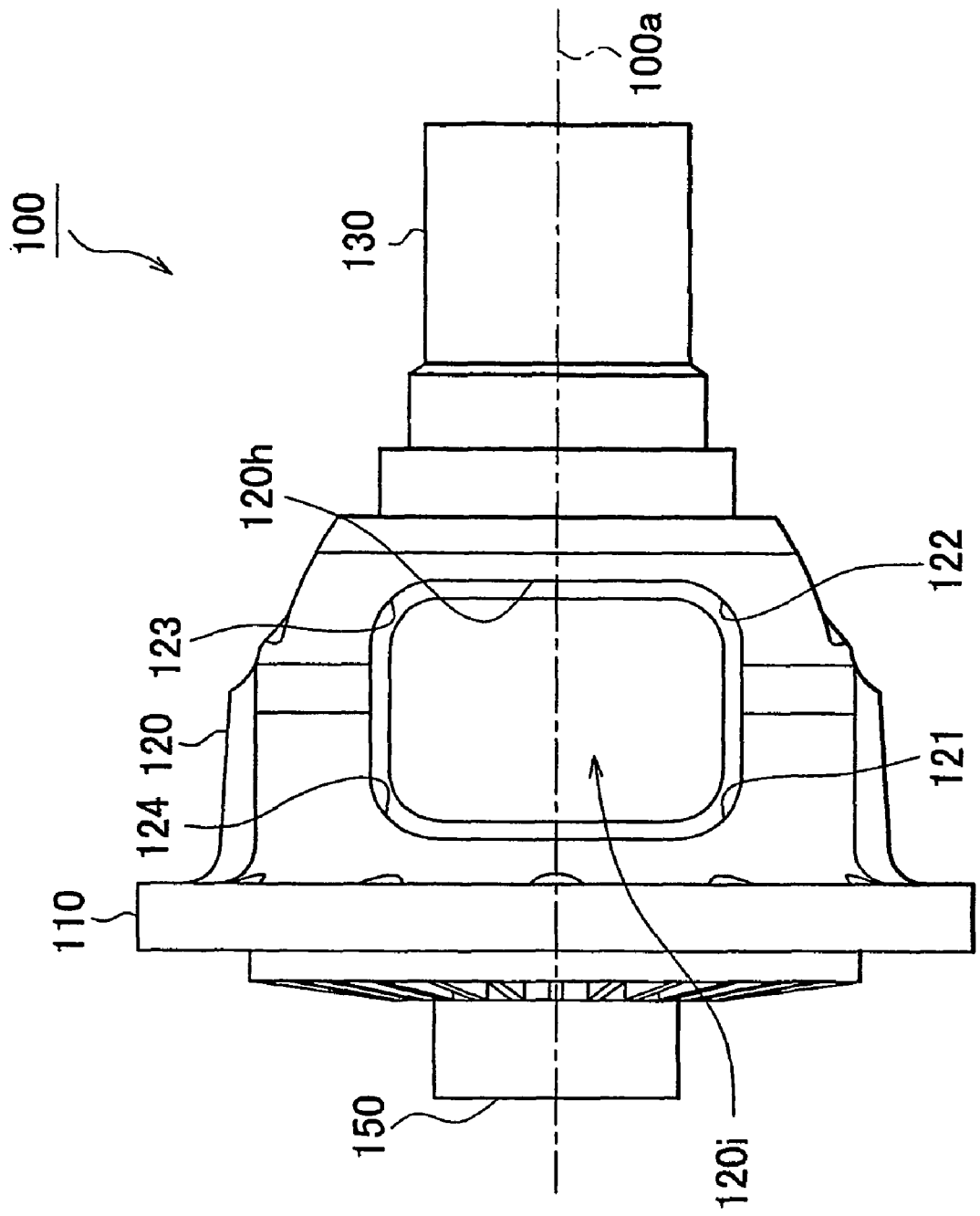
FIG. 12 is a left side view of a differential case used in a differential gear unit according to a second embodiment of the invention.

FIG. 12 is a left side view of a differential case used in a differential gear unit according to a second embodiment of the invention. Referring to FIG. 12, in the differential gear unit according to the second embodiment of the invention, the shape of the opening 120h is symmetrical with respect to the rotational axis 100a. However, the differential gear unit according to the second embodiment is different from the differential gear unit according to the first differential gear unit in that induction heat treatment is performed on the first corner portion 121 and the third corner portion 123 in order to partially increase the strength in the second embodiment. As the heat treatment for the first corner portion 121 and the third corner portion 123, various treatments for increasing the metal life, for example, induction hardening and carburizing treatment can be performed. Also, physical treatments, for example, shot blasting and shot peening, may be performed on the first corner portion 121 and the third corner portion 123. Namely, in the differential case used in the differential gear unit according to the second embodiment of the invention, the fatigue life of the differential case is adjusted by performing heat treatment on the predetermined portion of the differential case.

As a modified example of the second embodiment, the following example can be employed. In the differential case in the differential gear unit according to the first embodiment in which the opening 120h of the differential case is asymmetrical with respect to the rotational axis 100a, the heat treatment or the physical treatment described in the second embodiment may be performed on the first corner portion 121 and the third corner portion 123. The fatigue life of the differential gear unit can be further increased by reducing a tensile stress by adjusting the shape, and by increasing the strength by performing the heat treatment or the physical treatment.

In the thus configured differential case according to the second embodiment, the same effects as the differential case according to the first embodiment can be obtained.

Figure 13:
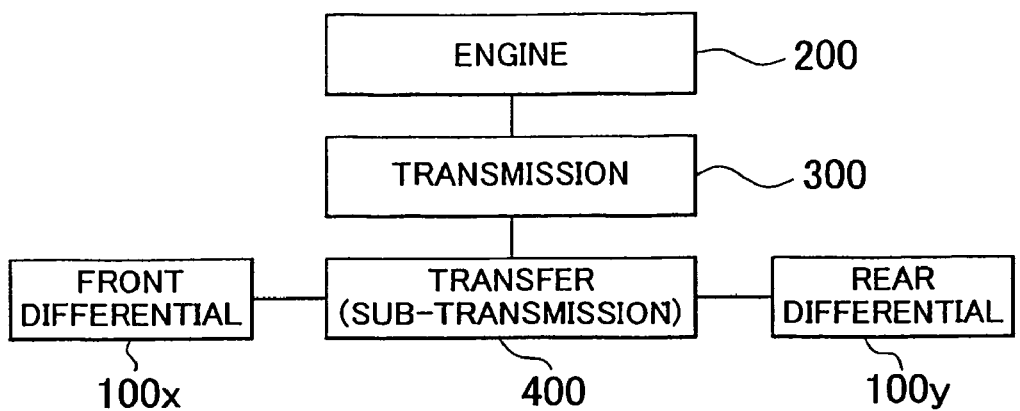
FIG. 13 is a first block diagram of a drive unit for a vehicle, to which the first or the second embodiment of the invention is applied.
Figure 14:
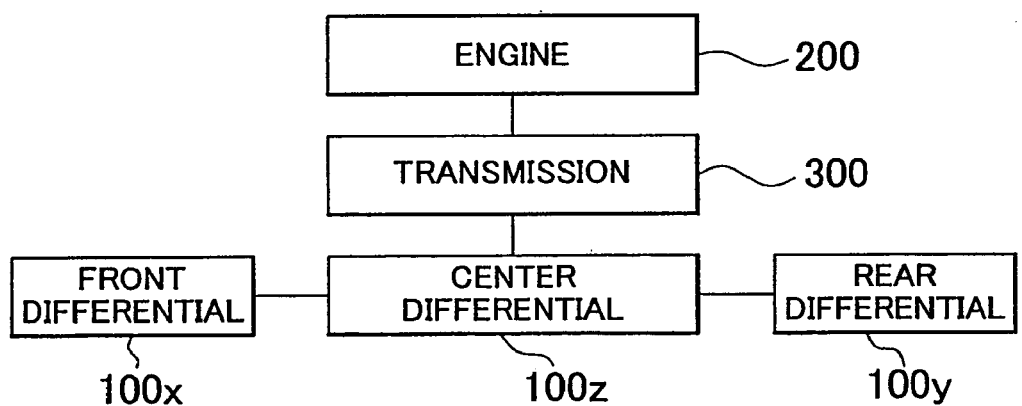
FIG. 14 is a second block diagram of the drive unit for a vehicle, to which the first or the second embodiment of the invention is applied.

Next, various cases will be described where the differential gear unit according to the first or second embodiment of the invention is applied to a drive unit for an automobile. FIG. 13 is a first block diagram for describing a drive unit for an automobile to which the differential gear unit according to the first or the second embodiment is applied. Referring to FIG. 13, the drive unit for an automobile includes an engine 200 which generates a driving force; a transmission 300 which receives the driving force from the engine 200 and which changes a rotational speed and rotational torque; a transfer 400 which serves as a sub-transmission which receives an output from the transmission 300 and which further changes the speed thereof; and a front differential 100x and a rear differential 100y which are connected to the transfer 400. The differential gear unit according to the first or the second embodiment can be applied to one of the front differential 100x and the rear differential 100y. FIG. 14 shows part time four-wheel drive vehicle in which there is no center differential. In such an automobile, the differential gear unit according to the first or the second embodiment can be used.

FIG. 14 is a second block diagram for describing the drive unit for an automobile to which the first or the second embodiment of the invention is applied. In FIG. 14, a center differential 100z for distributing power of the transmission 300 is provided, and an output from the center differential 100z is transmitted to the front differential 100x and the rear differential 10y. The differential gear unit according to the first or the second embodiment can be applied to at least one of the front differential 100x, the center differential 100z and the rear differential 100y. A transfer serving as a sub-transmission may be provided between the center differential 100z and the transmission 300. The drive unit in FIG. 14 is a drive unit for the full time four-wheel drive vehicle. The differential gear unit according to the invention can be provided in such a full time four-wheel drive vehicle.

Figure 15:
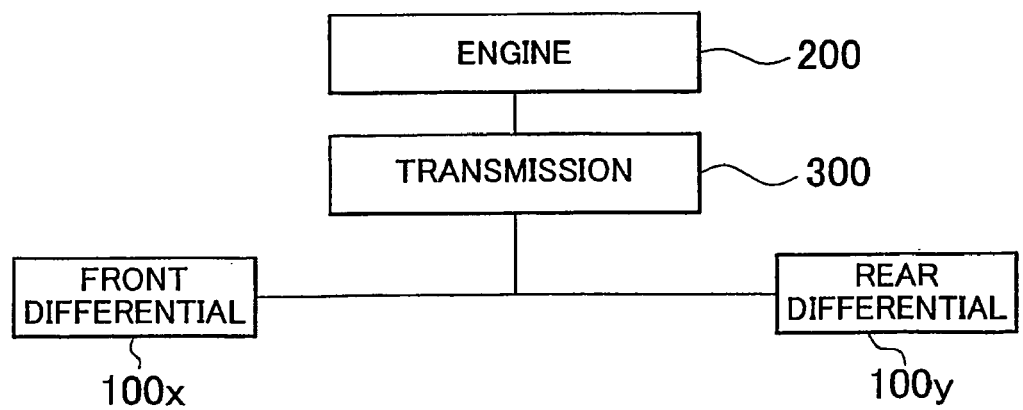
FIG. 15 is a third block diagram of the drive unit for a vehicle, to which the first or the second embodiment of the invention is applied.

FIG. 15 is a third block diagram for describing the drive unit for an automobile to which the differential gear unit according to the first or the second embodiment of the invention is applied. Referring to FIG. 15, the drive unit for an automobile to which the differential gear unit according to the first or the second embodiment is applied is different from the drive unit for an automobile shown in the second block diagram in that the center differential is omitted in the drive unit for an automobile in FIG. 15. Namely, the output from the transmission 300 is distributed to the front differential 100x and the rear differential 100y without using the center differential. The differential gear unit according to the first or the second embodiment can be applied to at least one of the front differential 100x and the rear differential 100y. A biscous coupling for absorbing a rotational difference between the front differential 100x and the rear differential 100y may be provided. As described so far, the differential gear unit according to the invention can be applied to a simplified four-wheel drive vehicle.

So far, the differential gear unit according to the first or second embodiment of the invention and the vehicle provided with the drive unit including the differential gear unit have been described. Meanwhile, the differential gear unit and the drive unit can be realized in various modified embodiments. First, the differential gear unit can be used not only as the differential gear unit for the front wheel and the rear wheel of an automobile but also as the center differential for a four-wheel drive vehicle or a six-wheel drive vehicle. Also, the differential gear unit can be applied not only to an automobile using a gasoline engine as a power source but also to a hybrid vehicle using gasoline and electric power as power, or a fuel cell vehicle.

So far, description has been made concerning the case where the invention is applied to a differential gear unit for a vehicle. However, a differential gear unit to which the invention is applied is not limited to a differential gear unit for a vehicle. The invention can be applied to any types of differential gear unit as long as the frequency of using one rotational direction and the frequency of using another rotational direction are different in the differential gear unit.

The invention can be applied to a differential gear unit for an automobile and a differential gear unit used in other fields.

The invention claimed is:

1. A differential gear unit which divides an input driving force into a first output and a second output and permits a difference between a rotational speed of the first output and a rotational speed of the second output, comprising:

a casing that defines an internal space and an opening communicated with the internal space and that is rotatable in a given rotational direction and in a rotational direction opposite to the given rotational direction, the casing including an input portion in which the driving force is input, the casing being configured such that fatigue life of the casing when the driving force is repeatedly input in the input portion in the given rotational direction is greater than fatigue life of the casing when the driving force is repeatedly input in the input portion in the rotational direction opposite to the given rotational direction, rotation in the given direction being a rotation around a longitudinal rotational axis of the differential gear casing;

a dividing mechanism that is provided in the internal space, and includes a pinion and that divides the driving force into the first output and the second output; and a support member that is provided so as to contact the casing and so as to support the dividing mechanism and that includes a pinion shaft that supports the pinion such that the pinion can rotate on its axis and which makes the pinion revolve around a center of the casing, wherein the fatigue life of the casing is adjusted by making a shape of the opening asymmetrical with respect to the longitudinal rotational axis of the casing, wherein the opening is in a basically elliptical shape having a round shape at each of corner portions, the round shapes of adjacent corner portions are different from each other, and a radius of the round shape of each corner portion continuously changes, wherein the curvature radii of each of the corner portions is different than a curvature of radii of a respectively adjacent corner portion, wherein a portion at which the fatigue life of the casing is increased is a first corner portion at which the tensile stress is generated when forward driving force is input, wherein the first corner portion has increased strength relative to other corner portions of the opening of the casing, wherein a curvature radius of the round shape of the first corner portion of the opening, where a tensile stress is generated when the driving force is input in the given rotational direction, is larger than a curvature radius of the round shape of a second corner portion of the opening, where a compression stress is generated when the driving force is input in the given rotational direction, wherein the fatigue life of the casing is also adjusted by heat treatment, and wherein the first corner portion of the opening of the casing is a heat treated corner portion.

2. The differential gear unit according to claim 1, wherein the casing includes a support portion that contacts the support member, and the fatigue life is measured by inputting the driving force in the input portion without rotating the support portion.

3. The differential gear unit according to claim 1, wherein the casing includes an output portion that is provided at a position that is different from a position of the support portion, and the fatigue life is measured by inputting the driving force in the input portion without rotating the output portion.

4. The differential gear unit according to claim 3,
wherein the opening further comprises a straight portion that is located closest to the output portion, and
wherein the straight portion is perpendicular to the longitudinal rotational axis of the differential gear casing.

5. The differential gear unit according to claim 1, wherein the first corner portion includes at least one of an induction hardening and a carburizing treatment.

6. The differential gear unit according to claim 1, wherein the casing includes a physically treated corner portion of the opening.

7. The differential gear unit according to claim 6, wherein the physically treated corner portion is the first corner portion.

8. The differential gear unit according to claim 6, wherein the physically treated corner portion includes at least one of shot blasting and shot peening.

9. The differential gear unit according to claim 1 further comprising a third corner portion that is not adjacent to the first corner portion,
wherein the fatigue life of the casing is also further increased at the third corner portion.

10. The differential gear unit according to claim 1, further comprising:
an output portion provided to the casing opposite the input portion; and
a third corner portion of the opening that has a curvature of radius larger than a curvature of radius of an adjacent corner portion and that is located farther from the input portion than from the output portion,
wherein the second corner portion is adjacent to the third corner portion and located farther from the input portion than from the output portion,
wherein the opening is a first opening,
wherein the casing includes a second opening identically dimensioned as the first opening,
wherein the support member includes a first hole and a second hole, and
wherein a circumferential distance around the casing between the first opening and the first hole is greater than a circumferential distance around the casing between the second opening and the first hole.

\* \* \* \* \*